United States Patent

[11] 3,534,764

[72] Inventors Paul J. Natho;
Ray G. Quast, Houston, Texas
[21] Appl. No. 768,429
[22] Filed Oct. 17, 1968
[45] Patented Oct. 20, 1970
[73] Assignee ACF Industries Incorporated
New York, New York
a corporation of New Jersey

[54] GATE VALVE SEAT CONSTRUCTION
2 Claims, 2 Drawing Figs.
[52] U.S. Cl. .................................................. 137/246.22,
137/629, 251/200
[51] Int. Cl. .................................................. F16h 3/10
[50] Field of Search .......................................... 251/196,
197, 199, 200; 211/; 137/629, 246.22

[56] References Cited
UNITED STATES PATENTS
2,954,960 10/1960 Dunbar ....................... 251/196
3,068,901 12/1962 Anderson ................... 251/196X Primary Examiner—Harold W. Weakley
Attorney—James L. Jackson ABSTRACT: A gate valve of the expanding gate type having seat assemblies which will not be moved by fluid pressure into tight high friction engagement with the gate assembly as the gate assembly is moved between the open and closed positions thereof, thereby preventing the development of excessive friction forces between the gate and seat assemblies. Fluid bleed passage means are provided which are effective upon slight movement of the gate assembly to bleed pressurized fluid from the valve flow passages into the valve chamber to balance the fluid pressure across the upstream seat assemblies thereby substantially preventing pressure actuation of the upstream seat assembly toward the gate member.

GATE VALVE SEAT CONSTRUCTION

BACKGROUND OF THE INVENTION

This invention relates generally to gate valve structures and more particularly to gate valve structures of the expanding gate type where the gate member is collapsed upon movement thereof between its open and closed positions in order to allow reciprocatory movement without developing excessive friction forces between the gate and seat assemblies of the valve. The gate member is expanded transversely by cooperating cam surfaces into tight sealing engagement with the seat assemblies to establish fluid tight sealing of the valve.

Ordinarily, the seat assemblies of expanding gate valves of the nature considered herewith are retained within seat recesses formed within the valve body by a friction fit generally referred to as a "press-fit." Under low pressure conditions, press fitted seat assemblies will be positively retained in full engagement within the seat recesses by friction force so that transverse collapsing of the gate assembly upon movement thereof between the open and closed position will establish clearance between the gate assembly and the seat assemblies. The collapsing and expanding gate assembly, therefore, functions effectively to reduce the friction force or gate drag between the gate assembly and seat assemblies upon opening and closing movement of the gate assembly.

When expanding gate valves are operating in extremely high pressure service, for example, service encountering fluid pressures of 10,000 p.s.i. or higher, it has been found that the upstream seat assemblies have a tendency to become pressure actuated by pressurized fluid from the flow passages of the valve, thereby causing movement of the upstream seat toward the gate assembly. Pressure actuation occurs when pressurized fluid from the flow passages enters the seat recesses behind the seat assemblies and acts upon the differential area between the force portion of the seat assemblies and the rear portion thereof in such manner as to develop a force which is sufficiently greater at the rear portion of the seat assemblies than at the face portion thereof to overcome the press-fit of seat assemblies and move the same downstream with the gate member as the gate is collapsed. When the seat assemblies are pressure actuated downstream, the seal between the working surface of the gate and the face surface of the seat assemblies will remain unbroken and extremely high friction forces will be developed between the gate member and the seat assemblies. The torque forces which are necessary to move the gate member between its open and closed conditions under circumstances where the seat assemblies are pressure actuated may be sufficiently great to require special apparatus for opening and closing the valve.

It is, therefore, a primary object of this invention to provide a novel expanding gate valve structure including seat assemblies which will not be pressure actuated into extremely high frictional engagement with the gate assembly as the gate assembly is collapsed.

It is a further object of this invention to provide a novel expanding gate valve structure including upstream seat assemblies which are subject to limited pressure actuation and which cooperate with other valve structure upon being slightly moved to develop a balanced pressure condition between the flow passages and the valve chamber to prevent further seat actuation.

Among the several objects of this invention is contemplated the provision of a novel expanding gate valve structure having seat assemblies which are provided with means for establishing a perimeter of sealing contact with the valve body and means for communicating pressurized fluid between the flow passages of the valve and valve chamber upon breaking of the perimeter of sealing contact when the seat assembly moves slightly under pressure actuation for the purpose of preventing further seat pressure actuation.

It is an even further object of this invention to provide a novel expanding gate valve structure including a gate member and seat assemblies which will separate as the gate member is collapsed to allow relatively friction free movement between the gate assembly and the upstream seat as the gate assembly is moved between the open and closed positions thereof.

It is another object of this invention to provide a novel expanding gate valve structure which is simple in construction, low in cost, and reliable in use.

The novel features of the present invention are set forth with particularity in the appended claims. The present invention both as to its organization and manner of operation together with other and further objects and advantages thereof may be best understood by way of illustration and example of certain preferred embodiments when taken in conjunction with the accompanying drawings in which:

Briefly, this invention concerns the provision of an expanding gate valve structure including upstream seat assemblies which are disposed one on either side of an expanding gate member. The seat assemblies will ordinarily be fitted within seat recesses which are formed within the valve body about the flow passage structure thereof. Sealing means is provided to establish a perimeter of sealing contact between the rear portion of the seat assemblies and the seat recess to prevent fluid pressure within the flow passages from entering the seat recesses radially beyond the perimeter of sealing contact when the seat assemblies are disposed in the fully seated position thereof. A fluid bleed passage is provided either in the seat assemblies or in the valve body and is communicated between the valve chamber and the area of the seat recess located peripherally beyond the perimeter of sealing contact. In the event the seat assembly should become pressure actuated and move slightly toward the gate member a few thousandths of an inch, the perimeter of sealing contact will be broken and pressurized fluid from the flow passages will flow behind the seat assembly and through the bleed passage to the valve chamber and will establish a balanced pressure condition between the flow passage and the valve chamber. This balanced pressure condition will preclude any further movement of a seat assembly toward the gate member by pressure actuation and will allow the gate assembly to be relatively free of friction forces caused by the upstream seat upon movement of the gate assembly between open and closed positions. The gate assembly will be subject to friction forces which force the gate member downstream into engagement with the downstream seat, however.

Figure 1:
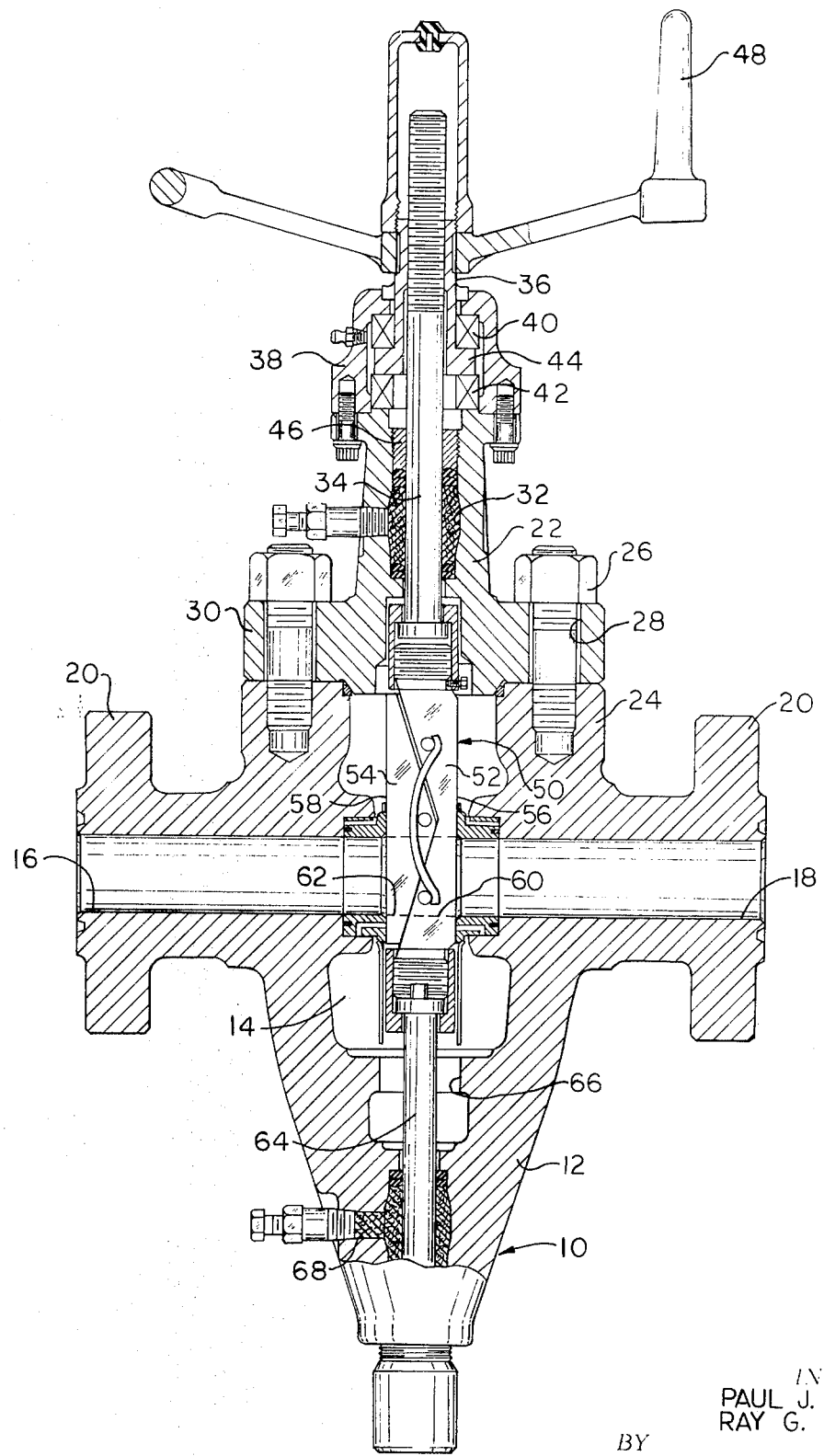
FIG. 1 is an elevational view in section of an expanding gate valve having a valve body and seat assemblies constructed in accordance with the present invention.

Referring now to the drawings for a more detailed description of the invention, in FIG. 1 there is illustrated an expanding gate valve shown generally at 10 which includes a valve body 12 defining a valve chamber 14. Inlet and outlet passages 16 and 18 are formed in the valve body 12 and are disposed in fluid communication with the valve chamber 14. The valve body 12 is provided with flanges 20 for bolted connection of the valve to conduit structure of conventional nature. Such flanged connection structure is not considered limiting as regards this invention, however, since it is obvious that other conventional connection structure, such as welded or threaded connection for example, may be employed without departing from the scope and spirit of this invention.

A bonnet member 22 is connected to an integral flange 24 formed on the valve body by means of studs 26 which extend through apertures 28 in a flanged portion 30 of the bonnet. The bonnet 22 is provided with an axial passage 32 through which extends an operating stem member 34 provided with external threads at the upper extremity thereof. The threaded portion of the operating stem 34 is received by an internally threaded drive nut 36 which is retained in assembly with the bonnet 22 by a bearing housing 38. Upper and lower thrust bearings 40 and 42, respectively, are disposed on the upper and lower sides of an annular flange 44 provided at the lower extremity of the drive nut 36 and are retained in proper aligned assembly with the bonnet 22 by the bearing housing 38.

A packing assembly 46 is disposed within the axial passage 32 and maintains a fluid tight seal between the bonnet 22 and the rotatable stem 34. An operating handle 48 is connected to the upper extremity of the drive nut 36 and is manually rotated to induce reciprocative movement to the operating stem 34. Manual operating structure such as illustrated in FIG. 1 is not to be considered as limiting in regard to this invention, however. It is intended that various commercially available valve operating devices might be employed to control opening and closing movement of the valve without departing from the spirit or scope of this invention.

An expanding gate assembly, illustrated generally at 50, is disposed within the valve chamber 14 and includes a gate element 52 and a segment member 54, each being provided with substantially planar working surfaces 56 and 58 respectively. The gate member 52 and the segment member 54 are provided with apertures 60 and 62 respectively which are disposed for registry with the flow passages 16 and 18 in the open position of the gate assembly 50. The upper portion of the gate member 52 is connected to the operating stem 34 and the lower extremity of the gate member is connected to a balancing stem 64 which extends through a balancing stem passage 66 formed in the valve body 12. A packing assembly 68 is disposed within the balancing stem passage 66 and serves to establish a fluid tight seal between the valve body 12 and the balancing stem 64. The balancing stem structure is intended only as illustrative of the particular valve modification shown in the drawings and is not intended as limiting in regard to this invention. It is obvious that valves structures without balancing stems may be employed within the spirit and scope of this invention.

Figure 2:
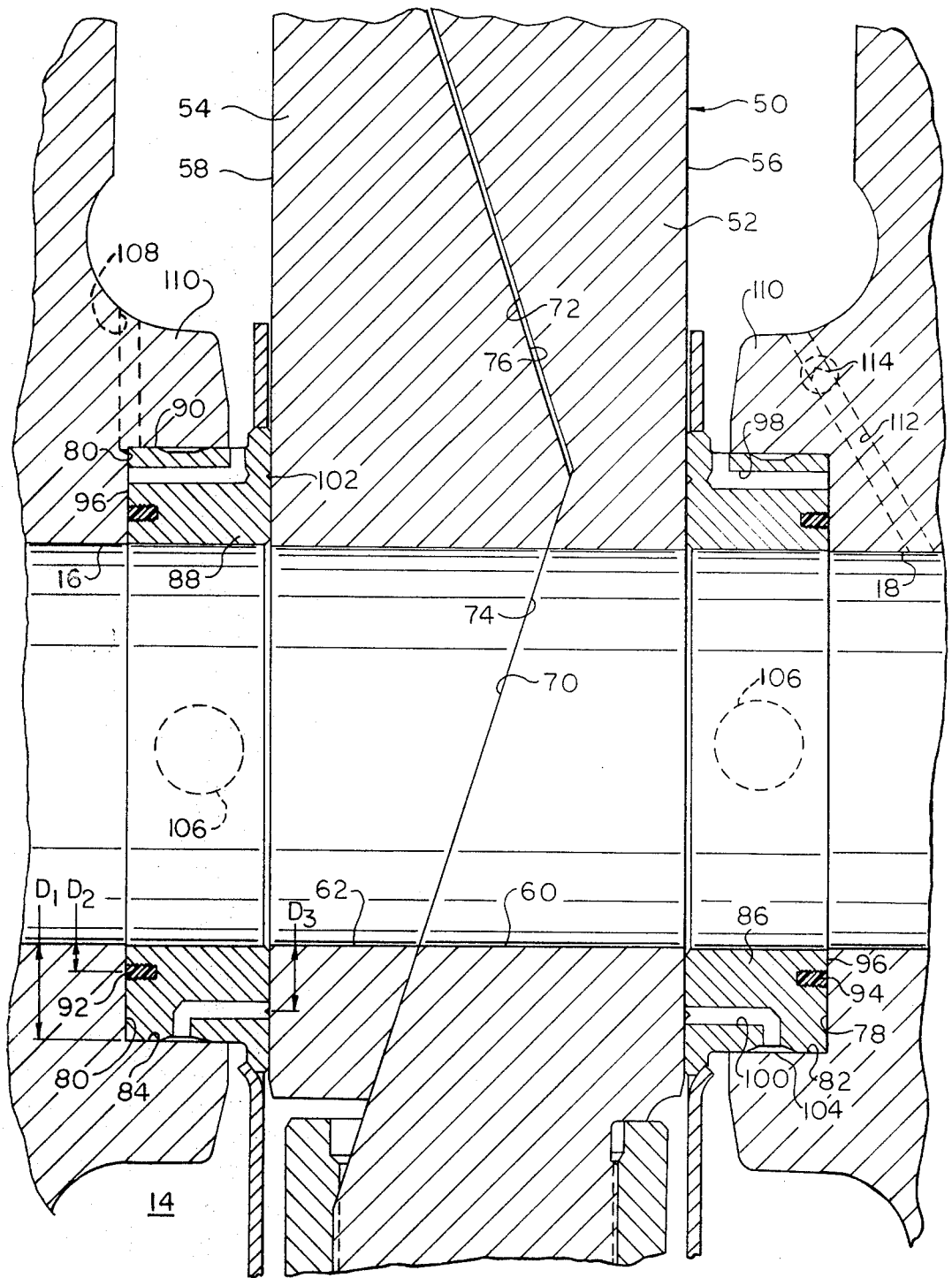
FIG. 2 is a fragmentary elevational view in section of the valve structure of FIG. 1 illustrating the seat assemblies thereof in detail and showing modified embodiments thereof.

With reference now to FIG. 2 of the drawings, the gate member 52 is provided with a pair of inclined cam surfaces 70 and 72 which cooperate with cam surfaces 74, and 76 respectively, formed on the segment member 54 to achieve lateral expansion of the gate assembly 50 as the gate assembly is moved to its fully open or fully closed positions. To cause camming of the gate assembly, the segment member will be stopped by engagement thereof with stops formed on the valve body prior to movement of the gate member to the fully open or fully closed position, thereby allowing the gate to move relative to the segment member. Such relative movement causes expansion of the gate assembly which results in forcible expansion of the working surfaces 56 and 58 thereof into tight sealing engagement with the seat assemblies. For a more detailed explanation of the structure and operation of an expanding gate assembly, reference may be had to U.S. Pat. No. 2,583,512.

The valve body 12 is provided with a pair of opposed seat recesses which are defined by circular planar bottom walls 78 and 80 which intersect cylindrical side walls 82 and 84 disposed generally concentrically relative to the flow passages 16 and 18. A pair of opposed seat assemblies 86 and 88 are press-fitted within the seat recesses in such manner that the exterior peripherial surfaces 90 thereof establish a friction fit with the cylindrical surfaces 82 and 84 of the seat recesses. Under low pressure conditions the friction fit between the seat assemblies and the wall of the seat recesses will be sufficient to retain the seat assemblies in the fully seated position thereof as illustrated in FIG. 2.

The seat assemblies 86 and 88 are of generally identical configuration and are provided with annular recess 92 at the rear portion thereof which is disposed in generally concentric relation with the flow passages 16 and 18. The recesses 92 are provided with serrated walls which retain a generally cylindrical sealing member 94 in interlocked relation within the seat assembly. The sealing member 94 may be formed of any of a number of commercially acceptable resilient materials or may be formed substantially inert plastic materials such as polytetrafluoroethylene which is sold under the registered trademark "Teflon" by E. I. duPont de Nemours and Company. The sealing member 94 extends slightly beyond the annular planar surface 96 defining the rear face of the seat assemblies so that the sealing member may be maintained under compressive sealing engagement with the planar surface 78 of the seat recess when the seat assemblies are forced by the gate assembly into the fully seated position thereof within the seat recesses. It is clearly apparent, therefore, that with the seat assemblies disposed in full engagement within the seat recesses a perimeter of fluid-tight sealing contact defined by reference character $D_2$ will be established between the sealing members 94 and the planar surface 78 of the seat recesses. It is anticipated that under high pressure operation of the valve construction that fluid pressure from the flow passages will enter the seat recesses between the seat assembly and seat recesses and will act upon a relatively small rear area of the seat assemblies, defined by the reference character $D_2$, and a relatively large front area of the seat assemblies, defined by the perimeter of sealing contact $D_3$ established by the seal between the seats and the gate assembly. It is clearly apparent, therefore, that in the fully open or fully closed position of the gate assembly, the forces produced by the pressurized fluid from the flow passages will ordinarily be greater against the front portion of the seat assemblies than at the rear portion thereof thereby causing the seat assemblies to be pressure actuated in a direction away from the gate assembly. Upon collapsing of the gate assembly, by relative cam movement as discussed above, fluid pressure may be communicated to the entire rear area of the seat assemblies, defined by the reference character $D_1$, by slight movement of the upstream seat assembly sufficient to cause leakage from the flow passage across the perimeter of sealing contact established between the sealing members 94 and the planar surface 78 or 80 of the upstream seat recess. When fluid pressure bypasses the sealing members 94 and bears upon the entire rear area of the seat assemblies, the upstream seat assemblies will not be moved because simultaneously fluid pressure from the flow passages will be communicated to the valve chamber 14 through bleed passages 98 which are formed for example, by intersecting drilled passages in the seat assemblies. Upon slight movement of the upstream seat assembly, therefore, it is apparent that fluid pressure from the flow passage will bypass the upstream seat assembly by way of the bleed passages and after a short time will develop a balanced pressure condition between the flow passages and the valve chamber. With the pressure differential across the seat assemblies in a balanced condition, it is obvious that the seat assemblies will not be subject to movement by pressure actuation. This pressure balancing sequence is intended to occur before the gate assembly reaches its fully collapsed condition so that only limited movement of the upstream seat will occur. The gate assembly will then be allowed to fully collapse without further movement of the seat assemblies by pressure actuation so that the upstream sealing surface of the gate assembly will move completely away from the upstream seat assembly during movement thereof between its open and closed positions. Upstream seat movement of this nature, however, will occur only when the expanding gate assembly 50 is moved toward its collapsed position. In the full open or full closed positions of the expanding gate assembly, the seat assemblies 86 and 88 will be forced into full engagement within the seat recesses as illustrated in FIG. 2.

As illustrated in FIG. 2, utilization of pressure balancing fluid bleed passages in the seat assemblies does not preclude the use of a lubrication system for the establishment of positive sealing between the working surfaces of the gate assembly and the sealing surfaces of the seat assemblies. The seat assemblies may be provided with lubrication passages 100 which establish fluid communication between a lubricant groove 102 formed in the face of the sealing members and a lubricant reservoir groove 104 which is formed about in the cylindrical surface 90 of the seat assemblies and which cooperates with the cylindrical surface 82 or 84 of the seat recess to define a lubricant reservoir. The lubricant reservoir is disposed in fluid communication with lubricant injection systems 106 shown in broken lines in FIG. 2. The lubricant injection systems 106 are of conventional nature and communicate lubricant or sealant material from the exterior of the valve to the lubricant reservoir disposed about the seat assemblies. It should be borne in mind that lubrication systems of this nature are not essential to the invention at hand, but such lubrication systems may be employed in combination with fluid pressure bleed systems within the spirit and scope of the present invention.

OPERATION

With the expanding gate assembly 50 in the fully expanded or open position as illustrated in FIG. 2, it is apparent that the seat assemblies 86 and 88 will be forced into full engagement within their corresponding seat recesses thereby urging the annular sealing members 94 into fluid tight sealing engagement with the annular planar surfaces 78 and 80. The sealing members 94 therefore, establish a perimeter of sealing contact at $D_2$ preventing fluid pressure from the flow passages 16 and 18 from getting behind the seat assemblies and exerting pressure actuating force on the full diameter of the seat assemblies.

As the expanding gate assembly 50 is collapsed by slight movement of the segment member 54 relative to the gate member 52, which causes relative movement between the cam surfaces 70 and 74, the mechanical force urging the seat assemblies 86 and 88 into the seat recesses will be dissipated. In the event fluid pressure from the flow passages 16 and 18 is sufficiently higher than fluid pressure within the valve chamber 14 acting through the surface area $D_2$ of the seat assemblies defined by the perimeter of the sealing contact, the force produced is sufficiently great that it overcomes the friction fit between the seat assemblies and the cylindrical walls 82 and 84 of the seat recesses, the seat assemblies will be urged slightly toward the collapsing gate assembly 50. Upon slight movement of the seat assemblies away from the respective planar bottom surfaces 78 and 80 of the seat recesses, sealing contact between the sealing members 94 and the surfaces 78 will be broken thereby allowing fluid pressure to flow behind the seat assemblies and to be communicated into the valve chamber 14 through the bleed passages 100.

Before the expanding gate assembly 50 can move between its fully expanded position to its fully collapsed position, the fluid pressure differential between the flow passages 16 and 18 and the valve chamber 14 will have become balanced and the pressure actuation force on the seat assemblies will dissipate thereby allowing the friction fit to retain the seat assemblies in a position spaced only at a few thousandths of an inch from the planar surfaces 78 and 80 of the seat recesses. The expanding gate member 50 will then move to its fully collapsed position upon further relative movement between the segment 54 and the gate member 52 thereby causing the working surfaces 56 and 58 of the seat assembly to be moved toward one another. The expanding gate member therefore, upon movement between its open and closed positions will not be in engagement with the upstream seat assembly and be subject only to seat drag caused by fluid pressure urging the gate assembly into engagement with the downstream seat assembly. As the gate assembly 50 is moved to its fully open or fully closed position, the segment member will be moved relative to the gate member thereby causing the cam surfaces 70 and 74 to urge the sealing surfaces of the gate assembly away from one another and into tight engagement with the seat assembly. When this occurs, the seat assemblies will again be forced into fully seated engagement within the respective seat recesses. It is therefore, clearly apparent that slight movement of the seat assemblies will be allowed during high pressure operation of the gate valve construction of this invention but the seat assemblies will not move sufficiently to maintain tight engagement with the gate assembly. The fluid bleed passages will communicate fluid pressure from the flow passages into the valve chamber only when the seat has moved away from the surfaces 78 and 80 sufficiently to break sealing contact between the sealing members 94 and the bottom wall 78 of the seat recesses.

As illustrated in broken lines on the left side of FIG. 2, the fluid bleed passage instead of being located in the seat assemblies, may be formed in the valve body in such manner as to communicate fluid pressure from the bottom portion of the seat recesses to the valve chamber. Fluid bleed passages 108 may be drilled through the bosses 110 of the valve body in such manner that the drilled passages 108 intersect the bottom planar walls 78 and 80 of the seat recesses. With the fluid bleed passages formed in this manner pressurized fluid will be communicated from the flow passages 16 and 18 to the valve chamber to the bleed passages 108 as the seat assemblies 86 and 88 move away from the planar surfaces 78 and 80 sufficiently to break sealing contact between the annular sealing members 94 and the planar surfaces 78 and 80.

As a further modification of our invention, balancing of fluid pressure between the flow passages 16 and 18 of the valve and the valve chamber 14 may be accomplished by providing drilled fluid bleed passages 112 which are controlled by a valve 114 or the like. The valve 114 may be opened responsive to slight movement between the gate and segment members of the expanding gate assembly to allow fluid pressure across the seat assemblies to become balanced. With the fluid bleed structure established by bleed passages 112 controlled by a valve or the like, it should be clearly apparent that the seat assemblies will be capable of moving only a slight distance from their fully seated position within the seat recesses because the balanced pressure condition will be developed before sufficient movement occurs between the gate and segment members to allow substantial movement of the gate assembly. The gate assembly, therefor, will not be subjected to upstream seat drag upon being moved between the open and closed positions thereof.

It is therefore clearly apparent that we have provided a novel expanding gate valve structure which includes seat assemblies that will not be pressure actuated into high friction engagement with the seat assemblies during movement thereof between open and closed position. This feature effectively reduces the torque required to induce movement of the gate assembly of high pressure gate valves between the open and closed positions thereof and allows the utilization of valve operator mechanisms of moderate cost. The seat assemblies of our invention are subject only to limited pressure actuation sufficiently to establish fluid communication between the flow passages and the valve chamber so that a balanced pressure condition may be achieved before the expanding gate assembly is fully collapsed. As the balanced pressure condition is reached, it is clear that the seat assemblies of our invention will not be subject to pressure actuation and will allow the gate assembly to fully collapse without further upstream seat movement. The fluid bleed seat construction of our invention will function effectively during movement of the expanding gate assembly from either the fully open or fully closed position thereof. Our invention achieves limited movement of the seat assemblies of a high pressure valve by utilization of structure which is extremely simple in nature, reliable in use and low in cost. The invention, therefore, is one well adapted to attain all of the objects hereinabove set forth together with other advantages which are obvious and inherent from a description of the apparatus itself.

It will be understood that certain features and subcombinations are of utility and may be employed without reference to other features and subcombinations. This is contemplated by and is within the scope of the appended claims. As many possible embodiments may be made of the invention without departing from the spirit or scope thereof, it is to be understood that all matters hereinabove set forth are to be interpreted as illustrative not in a limiting sense.

We claim:

1. An expanding gate valve having a valve body defining a valve chamber and having inlet and outlet flow passages which intersect the valve chamber, a pair of seat recesses formed in the valve body about the flow passages, a pair of valve seats received one within each of said seat recesses, an expanding gate disposed within said valve chamber, said gate being movable between open and closed positions thereof to control the flow of fluid through said flow passages, means for imparting reciprocatory movement to said gate, said gate having generally parallel sealing surfaces and being expandable in the full open and full closed positions thereof to force said sealing surfaces into fluidtight sealing engagement with said seat assembly means and being collapsible between the open and closed positions thereof to move said sealing surfaces out of intimate sealing contact with said seat assembly means, said valve seats comprising annular rings having a planar sealing face for sealing engagement with the sealing surface of said gate and a back face disposed in juxtaposition with a wall of said seat recess, an annular back seal groove formed in said seat rings, a back sealing member disposed within said back seal groove and establishing sealing engagement with said wall of said seat recess, by-pass passage means formed in each of said seats and extending from said back face to an exterior periphery of said seat ring, whereby movement of either of said seats toward said gate will break the seal between said back sealing member and said wall of said recess and establish fluid communication between said flow passages and said valve chamber, an annular peripheral lubricant groove formed about the outer periphery of each of said seats, a lubricant sealing groove formed in the planar sealing face of each of said seats, lubricant passage means formed in said seats and establishing fluid communication between said peripheral lubricant groove and said sealing groove.

2. An expanding gate valve having a valve body defining a valve chamber and having inlet and outlet flow passages means disposed in fluid communication with said valve chamber, at least one seat recess means formed in the valve body about the flow passages, seat means being disposed within said seat recess means, an expanding gate disposed within said valve chamber and being movable between open and closed positions to control the flow of fluid through said flow passage, means for imparting reciprocatory movement of said gate, said gate being collapsible for movement between the open and closed positions thereof and being expandable at the full open and full closed positions thereof into sealing engagement with said seat means, said valve body having bleed passage means formed therein for communicating fluid pressure between said flow passage means and said valve chamber to balance the fluid pressure across said seat means and to prevent excessive drag between said seat means and said gate during opening and closing movement of said gate, valve means disposed within said valve body and controlling the flow of fluid through said bleed passage means.